Patented Sept. 22, 1953

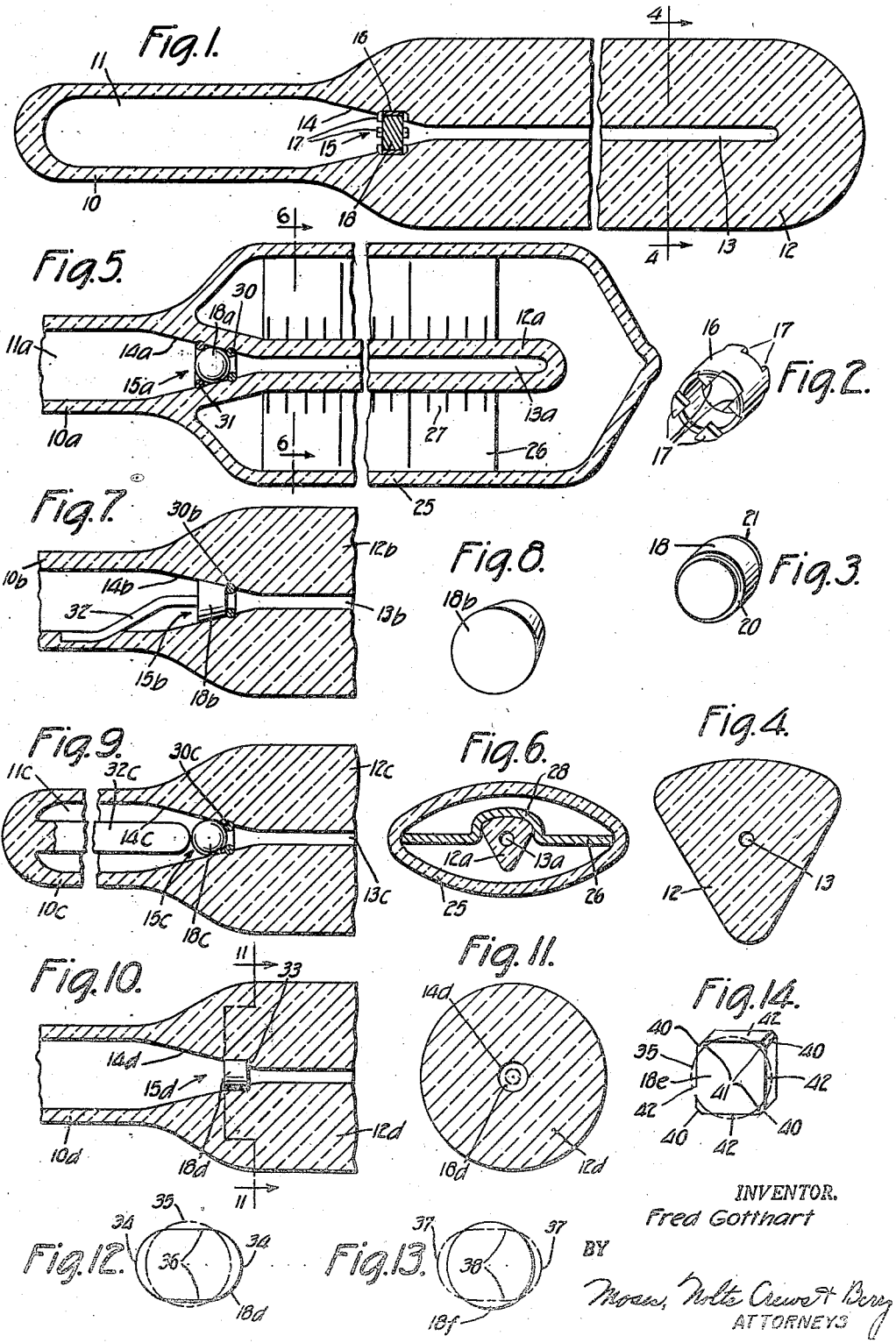

2,652,726

UNITED STATES PATENT OFFICE 2,652,726

MAXIMUM INDICATING THERMOMETER

Fred Gotthart, Ridgewood, N. Y.

Application August 5, 1949, Serial No. 108,768

20 Claims. (Cl. 73—371)

1

The present invention relates to thermometers of the maximum indicating type, such as clinical thermometers.

The conventional thermometer of the maximum indicating type consists essentially of a body or stem having a capillary bore therealong, a temperature sensing reservoir bulb containing a thermoexpansive liquid, such as mercury, and communicating with said bore, a temperature scale extending along said bore and marked on or fastened to the body or stem, and a constriction between said bulb and said bore permitting the liquid to expand from said bulb into said bore, upon rising temperatures, but preventing return flow of said liquid in said bore into said bulb, when the thermometer is removed from the heating zone, to maintain maximum temperature readings. To bring the liquid down into the bulb, it is necessary to shake the thermometer by whipping or shaking action.

The usual constriction of the thermometer of this type is formed entirely of glass and is generally made by expanding a small portion of the bore to form therein a small blister and thereafter allowing the walls of said blister to collapse entirely against each other, to close the cross-sectional area of the bore and to form, thereby, a constriction in said bore. If heat expands the liquid in said bulb, the pressure of the liquid forces the constriction and escapes into the capillary bore, so that said constriction acts like a check-valve. Manufacturers of this constriction is slow and tedious, requires great manipulating skill and results in the spoilage of a large percentage of thermometers.

One object of the present invention is to provide a new and improved maximum indicating thermometer having check-valve parts so designed that they lend themselves readily to uniform manufacture by machine tools and assembled in the thermometer by machine tools or fixtures.

Another object is to provide a new and improved maximum indicating thermometer, which lends itself readily to manufacture economically by modern production methods with minimum of spoilage and which does not require skilled artisans for its production.

Another object of the present invention is to provide a new and improved maximum indicating thermometer having in place of the usual constriction structure, a prefabricated resilient check valve designed to permit the indicating liquid to be ejected into the reservoir bulb with a minimum of whipping action.

As a feature of the present invention, the thermometer, instead of the usual construction, has a check valve with a prefabricated resilient insert which leaks on increase of pressure, as for example, above one pound per square inch. This resilient insert has any suitable shape.

Various other objects of the invention are apparent from the following description and by the accompanying drawings, in which Fig. 1 is an enlarged axial section of a form of clinical maximum indicating thermometer embodying the present invention and shown of the type in which the scale is engraved on the stem;

Fig. 2 is a perspective of the check valve housing used in the construction of Fig. 1;

Fig. 3 is a perspective of another part of the check valve used in the construction of Fig. 1;

Fig. 4 is a transverse section of the stem of the thermometer taken on lines 4—4 of Fig. 1;

Fig. 5 is an enlarged fragmentary axial section of another form of maximum indicating thermometer embodying the present invention, and shown of the type in which a separate scale is inserted and fastened in position.

Fig. 6 is a transverse section of the stem of the thermometer taken on the lines 6—6 of Fig. 5;

Fig. 7 is an enlarged fragmentary axial section of still another form of maximum indicating thermometer embodying the present invention;

Fig. 8 is a perspective of the plug of the check valve used in the construction of Fig. 7;

Fig. 9 is an enlarged fragmentary axial section of a still further form of maximum indicating thermometer embodying the present invention;

Fig. 10 is an enlarged fragmentary axial section of a maximum indicating thermometer embodying another form of the present invention;

Fig. 11 is a transverse section of the thermometer taken on lines 11—11 of Fig. 10;

Fig. 12 is an end view of an elastic member constituting the valve in the thermometer of Fig. 10 for a valve passage of circular cross-section and shows in full lines the shape of said member in unstressed unmounted position and in dot and dash lines, the shape of said member distorted into mounted position;

Fig. 13 is an end view of another form of elastic member constituting the valve for a thermometer like that of Fig. 10, except that the thermometer has a valve passage of somewhat elliptical or oblated cross-section, and shows in full lines the shape of said member in unstressed unmounted position and in dot and dash lines, the shape of said member distorted into mounted position; and Fig. 14 is a perspective of still another form of elastic member constituting the valve in the thermometer of Fig. 3 for a valve passage of circular cross-section, and shows in full lines, the shape of said member in unstressed unmounted position and in dot and dash lines, the shape of said member distorted into mounted position.

Referring to Figs. 1 to 4 of the drawings, there is shown a form of maximum indicating thermometer of the clinical type, comprising a glass bulb 10 at its lower end defining a reservoir chamber 11 for a temperature responsive liquid, such as mercury, and serving as the temperature sensing member to be inserted in the temperature zone to be measured, such as the mouth or rectum. Connected to the glass bulb 10 is an upper glass capillary tube or stem 12 having a capillary bore 13 along its length closed at one end and in valve-controlled communication at its other end with the bulb chamber 11. The stem 12 is engraved on its outside with the usual temperature scale (not shown). Between the bore 13 and the bulb chamber 11 is located a check valve 15. This check valve 15 comprises a metal cage or housing 16 in the form of a short cylindrical tube or jacket open at each end to permit restricted flow therethrough and having at each end a series of radially inwardly projecting fingers or prongs 17 (four being shown quadrantly arranged) of approximately segmental shape. The glass of the thermometer is fused around this cage 16 to permanently hold said cage in fixed position in passageway 14. A valve member 18 shown in the form of a cylindrical plug of resilient material, not affected by the liquid nor affecting said liquid, such as neoprene, plastic or other suitable elastomer is retained snugly in the cage 16 and is desirably provided with bevels 20 and 21 at its ends respectively.

In the operation of the thermometer of Figs. 1 to 4, when the bulb 10 is placed in the temperature zone to be measured, the temperature responsive liquid in said bulb expands and acting upon the outer periphery of the resilient valve member 18 with hydraulic force having radially inward components, distorts this valve member sufficiently to permit leaking of said liquid from said bulb to the capillary bore 13 and along said member, through the annular passage formed between the outer periphery of said valve member and the inner periphery of the cage 16 until temperature equals bulb temperature. The prongs 17 hold the valve member 18 in place. When the bulb 10 is removed from the temperature zone being measured, the liquid ceases to expand, so that the valve member 18 expansively returns radially outwardly into snug engagement with the inner periphery of the cage 16 and thereby blocks return of said liquid from the stem bore 13 to said bulb. The maximum temperature reading is thereby maintained.

When the thermometer is shaken, even with gentle manipulation, the centrifugal force in the liquid created, compresses the valve member 18 radially inwardly and permits quick ejection of said liquid from the stem bore 13 through the check valve 15 and into the bulb 10.

Figs. 5 and 6 show another type of maximum indicating thermometer embodying the present invention. In this embodiment of the invention, the thermometer comprises a glass bulb 10a at its lower end defining a reservoir chamber 11a for the temperature responsive liquid, an upper glass capillary tube or stem 12a having a capillary bore 13a along its length closed at one end and in valve-controlled communication at the other end with said bore through a passage 14a, an outer transparent glass shell 25 of substantially elliptical cross-section enclosing said stem and scale 26 made of sheet material containing temperature graduations 27 visible through said shell. This scale 26 may be of suitable material such as paper, metal or glass and extends across the long diameter of the cross-section of the shell 25, as shown in Fig. 6. The stem 12a is desirably of substantially magnifying triangular cross-section and the intermediate section 28 of the scale 26 is shown off-set to bring capillary tube and scale even.

The check valve 15a in the passageway 14a comprises a cage consisting of two axially spaced coaxial metal rings 30 and 31, which are permanently retained in said passageway by fusing the glass therearound. Retained between the two rings 30 and 31 is a valve member 18a in the form of a spherical ball of resilient material, such as neoprene or other elastomer, having a diameter sufficiently large to touch the wall of the passageway 14a, as shown, when said ball is free from liquid pressure action, due to temperature indicating operations or resetting manipulations. This ball 18a is compressed into substantially ellipsoidal shape by the expansive pressure action of the liquid thereon, upon rising temperatures, permitting thereby the flow of said liquid from the bulb 10a into the stem bore 13a and is restored into spherical shape when said bulb is removed from the temperature zone, to maintain the column of liquid in the capillary bore against return flow into said bulb. The rings 30 and 31 keep resilient member 18a in position during this operation.

Figs. 7 and 8 show another form of thermometer similar to the type shown in Figs. 1–4 and similarly comprising a bulb 10b, a capillary stem 12b with a capillary bore 13b and a conical passageway 14b between the hollow of said bulb and said bore. In this passageway 14b is a check valve 15b comprising a metal ring 30b retained permanently in position by fusing of the glass around it. Seated against this ring 30b is a valve member 18b shown in the form of frusto-conical plug of resilient material, having an outer surface angularity corresponding to that of the passageway 14b for peripheral conforming engagement with said passageway, as shown. This valve member 18b is retained against axial movement towards the capillary bore 13b by the ring 30b and is retained against axial movement in the opposite direction by a seat member or stool 32, shown in the form of a rod of suitable material, such as metal, offset at its ends, and having one end permanently retained in the wall of the bulb 10b by fusing its glass around it and having its other offset end coaxial with said valve member and abutting the larger end face of said valve member.

The operation of the check valve 15b is similar to that already explained in connection with the forms of the invention shown in Figs. 1–6. That is, the valve member 18b is compressed by the pressure of the expanding liquid in the bulb 10b, to decrease its cross-sectional area and to permit flow of said liquid into the capillary bore 13b. The valve member 18b is restored to its full cross-section when the temperature stops rising, so that return flow is checked and maximum temperature reading is maintained.

Fig. 9 shows another form of thermometer, comprising the bulb 10c defining the reservoir chamber 11c, the capillary stem 12c with its capillary bore 13c and the conical passageway 14c between said chamber and said bore. The check valve 15ᶜ in this passageway 14ᶜ comprises a metal ring 30ᶜ retained permanently in position by fusing of the glass around it. Seated against this ring 30ᶜ is a valve member 18ᶜ shown in the form of a spherical ball of resilient material, having a diameter large enough, so that said ball in pressure released condition touches the walls of the passageway 14ᶜ. This valve member 18ᶜ is held against movement towards the capillary bore 13ᶜ by the ring 30ᶜ and is held against movement in the opposite direction by a seat member or stool 32ᶜ, shown in the form of a cylindrical glass rod extending axially of the bulb chamber 11ᶜ and having one end integral with the wall of the bulb 10ᶜ and having its other end rounded and touching the valve member.

The operation of the check valve 15ᶜ is similar to that explained in connection with the form of the invention shown in Figs. 5 and 6.

Figs. 10, 11 and 12 show still another form of thermometer, comprising the bulb 10ᵈ, the capillary stem 12ᵈ and the passageway 14ᵈ between the hollows thereof.

To prevent the resilient member of the check valve 15ᵈ in the passageway 14ᵈ from being wedged so tightly at its restricted end as to block flow of the liquid through said valve and into the bulb 10ᵈ, said passageway has at this end an axially facing annular shoulder or seat 33 for said resilient member. The end portion of the passageway 14ᵈ may be formed by a square-ended cylindrical mandrel (not shown) while the glass is still plastic and is being shaped.

The check valve 15ᵈ comprises a valve member 18ᵈ of resilient material, disposed in the cylindrical end section of the passageway 14ᵈ against the seat 33 and having a uniform cross-section throughout its length. This valve member 18ᵈ has in unstressed condition an elongated somewhat elliptical or oblated cross-section, as indicated in full lines in Fig. 12, with opposite curved end sections 34 projecting outwardly beyond a circle 35 shown in dot and dash lines in Fig. 12 and corresponding to the cross-section of the passageway 14ᵈ at its restricted end, and opposite flattened side sections 36 projecting inwardly of said circle.

The valve member 18ᵈ is retained without the use of cages, wires or stools in the restricted end of the passageway 14ᵈ to assume a circular cross-section corresponding to the cross-section of said passageway, indicated by the circle 35, as shown in Fig. 12. In this distorted condition, the valve-member 18ᵈ will be retained firmly and frictionally in the restricted end of the passageway 14ᵈ, as shown in Fig. 10. Under these distorted conditions, the end sections 34 of the valve member 18ᵈ will be pressed inwardly to the region of the circle 35 by the wall of the passageway 14ᵈ, thereby causing the flattened side sections of said valve member to expand outwardly to said circle region and into engagement with said wall.

Upon operation, when the liquid in the bulb 10ᵈ is expanding due to rising temperature, the pressure thereof acting on the valve member 18ᵈ causes the opposite expanded side sections 36 of the said member to be pressed radially inwardly and away from the wall of the passageway 14ᵈ to form openings along which said liquid can overflow into the stem 12ᵈ, while the sections 34 of said valve member remain in contact with said wall. When liquid expansion ceases, the valve member 18ᵈ will be restored into shape to prevent return flow of the column of liquid from the stem 12ᵈ into the bulb 10ᵈ.

When the thermometer is shaken, the force created by the liquid column in the stem 12ᵈ forces the expanded side sections 36 of the valve member 18ᵈ to be compressed radially inwardly and the liquid to escape along said sections towards the bulb 10ᵈ, while the end sections 34 of said member remain firmly in contact with the wall of the passageway 14ᵈ and thereby hold said member against axial displacement in said passageway.

Fig. 13 shows a modified form of resilient distortable valve member 18ᶠ employable in connection with a thermometer (not shown) which in certain aspects, differs from the thermometer shown in Fig. 10. This modified form of thermometer, instead of having a generally circular passageway with a restricted shouldered end section of cylindrical shape, as in Fig. 10, has a generally conical passageway with a restricted shouldered end section having a cross-section uniform throughout its length and elliptical or oblated, as indicated in dot and dash lines in Fig. 13. This end section of the passageway of the thermometer with its seating shoulder may be made, as in the construction of Fig. 10, by a mandrel cross-sectionally shaped to correspond with the elliptical or oblated outline, indicated in dot and dash lines in Fig. 13.

The valve member 18ᶠ which is of resilient material, is, in unstressed condition, cylindrical in shape, as indicated in full lines by the circle in Fig. 13. The diameter of this circle is such, with respect to the elliptical outline of the cross-section of the passageway of the thermometer, that said circle extends at two opposite sides inwardly from the opposite curved end sections 37 of said outline and at the other two opposite sides outwardly from the opposite flattened side sections 38 of said outline. When the valve member 18ᶠ is retained in the restricted end section of the passageway of the thermometer, it will be distorted into the elliptical or oblated shape shown in dot and dash lines in Fig. 13.

Upon operation, when the liquid in the bulb is expanding due to rising temperature, the pressure thereof acting on the valve member 18ᶠ, causes its side portions, which have been expanded to conform with the curved end sections 37 of the oblated or elliptical outline of the cross-section of the passageway of the thermometer, to be pressed radially inwardly and away from the wall of said passageway, to form openings along which said liquid can overflow into the stem of the thermometer, while its side portions which have been compressed to conform with the flattened side sections 38 of said outline remain in contact with said wall. When the liquid expansion ceases, the valve member 18ᶠ will be restored into shape to prevent return flow of the column of liquid from the stem into the bulb of the thermometer.

When the thermometer is shaken, the force created by the liquid column in the stem forces the expanded side sections of the valve member 18ᶠ to be forced radially inwardly and the liquid to escape along said sections towards the bulb, while the compressed side sections of said valve member remain firmly in contact with the wall of the passageway of the thermometer, thereby holding said member against displacement axial in said passageway.

Fig. 14 shows another form of resilient distortable valve member 18ᵉ which can be employed in connection with the thermometer of Fig. 10. In this form of the invention, the resilient valve member 18$^e$, which is uniform throughout its length and which when said valve member is unstressed is substantially square, except for bevelled corners 40. This cross-section is such as respect to the circle 35 indicating the cross-section of the passageway 14$^d$ at its restricted shouldered end, as to project outwardly beyond said circle at the corner sections 41 and inwardly of said circle at the side sections 42.

The valve member 18$^e$ is distorted in the passageway 14$^d$ into cylindrical shape by the cylindrical wall of said passageway and will be frictionally retained in said passageway without the use of cages, wires or stools. The bevelled corners 40 afford initial bearing surfaces of substantial areas at the corner sections 41, when the valve member 18$^e$ is first inserted in the passageway 14$^d$, so that folding of the corners of said member during this insertion is prevented.

Under distorted conditions, the corner sections 41 of the valve member 18$^e$ will be compressed radially inwardly by the wall of the passageway 14$^d$, to the circle 35, while the side sections 42 of said member will be expanded by the compression action on said corner sections 41, radially outwardly into contact with said wall.

Upon operation, when the liquid in the bulb 10$^d$ is expanding due to rising temperature, the pressure thereof acting on the valve member 18$^e$ causes the expanding side sections 42 of said member to be pressed radially inwardly and away from the wall of the passageway 14$^d$ to form openings along which said liquid can overflow into the stem 12$^d$, while the corner sections 41 of said valve member remain in contact with said wall. When liquid expansion ceases, the valve member 18$^e$ will be restored into shape to prevent return flow of the column of liquid from the stem 12$^d$ into the bulb 10$^d$.

When the thermometer is shaken, the force created by the liquid column in the stem 12$^d$ forces the expanded side sections 42 of the valve member 18$^e$ to be compressed inwardly and said liquid to escape along said sections towards the bulb 10$^d$, while the corner sections 41 of said member remain firmly in contact with the wall of the passageway 14$^d$ and thereby hold said member against axial displacement in said passageway.

While the invention has been described with particular reference to specific embodiments, it is to be understood that it is not to be limited thereto but is to be construed broadly and restricted solely by the scope of the appended claims.

What is claimed is:

1. A thermometer of the maximum indicating type comprising a temperature sensing bulb defining a liquid reservoir chamber for a temperature responsive liquid, a stem connected to said bulb and having a bore, there being a passageway affording communication between said chamber and said bore, a check valve in said passageway having a valve member of resilient material in the form of a plug, means restraining bodily movement of said valve member along said passageway, said member normally shutting off flow of liquid through said valve and exposed at a section of its outer periphery to the pressure action of the liquid from said bulb chamber and from said stem bore the area of said section of the valve member being large enough compared with the area of the end of the valve facing said bulb chamber, whereby when the liquid in said bulb chamber is expanding due to the sensing of rising temperature, the pressure action of said liquid at said section of said valve member compresses said section radially inwardly to define an opening through which said expanding liquid can overflow from said bulb chamber into said stem bore, and when said liquid ceases to expand, the valve member is restored by its inherent resiliency into shape to block return flow of said liquid from said stem bore to said bulb chamber, and whereby when the thermometer is shaken the resulting pressure of the liquid in said stem bore upon said section of said valve member compresses said section radially inwardly sufficiently to permit said liquid to be ejected into said bulb chamber.

2. A thermometer as described in claim 1, said passageway having a circular cross-section and said valve member having a circular cross-section at right angles to the longitudinal axis of the thermometer, whereby the circular periphery of said valve member is exposed to the action of the liquid, and said liquid when under pressure distorts the cross-section of said valve member with respect to the cross-section of said passageway and permits thereby flow of liquid past said valve member.

3. A thermometer of the maximum indicating type comprising a temperature sensing bulb defining a liquid reservoir chamber for a temperature responsive liquid, a stem connected to said bulb and having a bore, there being a passageway affording communication between said chamber and said bore, and a check valve in said passageway, comprising a cage retained by the wall of said passageway, and a resilient valve member in the form of a plug held in position in said passageway by said cage, said valve member normally closing said passageway and being held against bodily movement along said passageway by said cage, said cage being of open structure to expose a section of the outer periphery of said valve member to the pressure action of the liquid from said bulb chamber and from said stem bore, whereby when the liquid in said bulb chamber is expanding due to the sensing of rising temperature, the pressure action of said liquid at said section of said valve member compresses said section radially inwardly to define an opening through which said expanding liquid can overflow from said bulb chamber into said stem bore and when said liquid ceases to expand, the valve member is restored by its inherent resiliency into shape to block return flow of said liquid from said stem bore to said bulb chamber, and whereby when the thermometer is shaken, the resulting pressure of the liquid in said stem bore upon said section of said valve member compresses said section radially inwardly sufficiently to permit said liquid to be ejected into said bulb chamber.

4. A thermometer as described in claim 3, said cage being in the form of a cylindrical tube with fingers at each end extending radially inwardly, said valve member being of cylindrical shape and being retained snugly in said tube.

5. A thermometer as described in claim 3, said cage comprising a ring of rigid material retained by the wall of said passageway and engaging one end of said valve member.

6. A thermometer as described in claim 3, said cage comprising a pair of coaxial rings retained by the wall of said passageway and axially spaced therealong, said valve member being held between said rings.

7. A thermometer as described in claim 3, said passageway tapering towards said stem bore, said cage comprising a pair of coaxial rings of different diameters partially embedded in the wall of said passageway and axially spaced therealong, said valve member being held between said rings.

8. A thermometer as described in claim 1, said passageway being of conical shape and tapering towards said stem bore, said valve member being of corresponding frusto-conical shape and fitting snugly in said passageway.

9. A thermometer as described in claim 1, said valve member being of spherical shape and normally extending into contact with the wall of said passageway.

10. A thermometer as described in claim 1, said passageway being of conical shape and tapering towards said stem bore, said valve member being of spherical shape and normally extending into contact with the wall of said passageway.

11. A thermometer of the maximum indicating type comprising a temperature sensing bulb defining a liquid reservoir chamber for a temperature responsive liquid, a stem connected to said bulb and having a bore, there being a passageway affording communciation between said chamber and said bore, a check valve in said passageway having a valve member of resilient material in the form of a plug, normally shutting off flow of liquid through said valve and exposed at a section of its outer periphery to the pressure action of the liquid from said bulb chamber and from said stem bore, the area of said section of the valve member being large enough compared with the area of the end of the valve facing said bulb chamber, whereby when the liquid in said bulb chamber is expanding due to the sensing of rising temperature, the pressure action of said liquid at said section of said valve member compresses said section radially inwardly to define an opening through which said expanding liquid can overflow from said bulb chamber into said stem bore and when said liquid ceases to expand, the valve member is restored by its inherent resiliency into shape to block return flow of said liquid from said stem bore to said bulb chamber, and whereby when the thermometer is shaken the resulting pressure of the liquid in said stem bore upon said section of said valve member compresses said section radially inwardly sufficiently to permit said liquid to be ejected into said bulb chamber, an abutment member of rigid material retained by the wall of said passageway and engaged by said valve member to retain said valve member against movement along said passageway in one direction towards said stem bore and a rod-like stool member in said bulb chamber fixed at one end to the wall of said bulb chamber and having its other end substantially engaging said valve member to retain said valve member against movement along said passageway in the opposite direction.

12. A thermometer as described in claim 11, comprising an abutment member of rigid material retained by the wall of said passageway and engaged by said valve member to retain said valve member against movement along said passageway in one direction towards said stem bore, and a rod-like stool member in said bulb chamber having its ends offset, and having one end partially embedded and retained in the side wall of said bulb chamber and having its other end extending centrally along said passageway and substantially engaging one end of said valve member at the center thereof to retain said valve member against movement along said passageway in the opposite direction.

13. A thermometer as described in claim 11, comprising an abutment member of rigid material retained by the wall of said passageway and engaged by said valve member to retain said valve member against movement along said passageway in one direction towards said stem bore and a straight rod in said bulb chamber extending centrally thereof and made substantially of the same material as the material of the bulb wall, said rod having one end integrally connected to the end wall of said bulb chamber and having its other end adjacent one end of said valve member to retain said valve member against movement along said passageway in the opposite direction.

14. A thermometer as described in claim 1, said passageway having a cross-section of predetermined shape, said valve member having a cross-section when unstressed with parts extending outwardly beyond an outline representing the first said cross-section in any transverse plane of said passageway and with other parts extending inwardly of said outline, said valve member in mounted position being distorted cross-sectionally by the wall of said passageway into the shape of said outline.

15. A thermometer as described in claim 1, said passageway having a circular cross-section, said valve member having an elongated cross-section when unstressed with the opposite ends extending outwardly beyond a circle representing said circular cross-section in any transverse plane of said passageway and with opposite sides flattened and extending inwardly of said circle, said valve member in mounted position being distorted by the wall of said passageway into circular cross-section.

16. A thermometer as described in claim 1, said passageway having an elongated cross-section, said valve member having a circular cross-section when unstressed, with two opposite sides extending inwardly from the ends of the elongated outline representing said first mentioned cross-section and with its other two opposite sides extending outwardly from the flattened sides of said outline, said valve member in mounted position being distorted by the wall of said passageway in cross-section corresponding to said outline.

17. A thermometer as described in claim 1, said passageway having a circular cross-section, said valve member having a substantially square cross-section when unstressed with the corner sections extending outwardly beyond the circle representing said circular cross-section in any transverse plane of said passageway and with the flat sides extending inwardly of said circle, said valve member in mounted position being distorted by the wall of said passageway into circular cross-section.

18. A thermometer as described in claim 1, said passageway being generally conical but having its smaller end section substantially cylindrical and terminating in an axial facing annular shoulder serving as a seat for said valve member.

19. A thermometer of a maximum indicating type comprising a temperature sensing bulb defining a liquid filled chamber, a stem connected to said bulb and having a bore, there being a passageway affecting communication between said chamber and said bore, a check valve member normally shutting off flow through said passageway in said passageway of resilient material and having a peripheral area large enough in relation to the area of the end surface of said valve member facing said bulb chamber to cause the compressive pressure action of expanding liquid in said bulb chamber acting against the periphery of the valve to deform said valve inwardly and to define thereby between said valve and the wall of said passageway one or more openings through which said expanding liquid overflows from said bulb chamber into said stem bore and means restraining bodily movement of said valve member along said passageway, said valve being restorable by its inherent resiliency into shape to prevent return flow of the liquid from said stem bore into said bulb chamber, when expansion of the liquid ceases, and being deformable by the pressure of the liquid when the thermometer is shaken, to form an opening or openings between said valve and the wall of said passageway through which the liquid is ejected from said stem bore to said bulb chamber.

20. A thermometer of the maximum indicating type comprising a bulb and a capillary tube connected to said bulb and having a capillary bore, said bulb and said bore being interconnected by a passage of predetermined cross-section, and a prefabricated resilient valve plug inserted in said passage and having a cross-section which does not conform with the cross-section of said passage when in unstressed condition outside said passage, said plug having a projecting part compressed inwardly by the wall of said passage when fitted in said passage and another part deformed by said compression outwardly into contact with said passage wall to cause said plug to conform in cross-section with the cross-section of said passage when fitted therein, whereby normally liquid leakage along said plug is checked, the peripheral area of the part of the plug deformed outwardly into contact with the passage wall being large enough in relation to the surface of the plug facing said bulb, whereby said outwardly deformed plug part is compressed inwardly by the liquid from the bulb when the pressure of said liquid rises due to rise in temperature, to form an opening between said plug and said passage wall along which the liquid is caused to flow from said bulb into said tube.

FRED GOTTHART.

References Cited in the file of this patent

UNITED STATES PATENTS

| Number | Name | Date |
|---|---|---|
| 2,045,693 | Broder | June 30, 1936 |

FOREIGN PATENTS

| Number | Country | Date |
|---|---|---|
| 165,837 | Germany | Dec. 1, 1905 |
| 281,878 | Germany | Feb. 4, 1915 |